(12) United States Patent
Brumberg

(10) Patent No.: US 7,353,200 B1
(45) Date of Patent: Apr. 1, 2008

(54) INTERNET-BASED EMPLOYEE STOCK OPTION PLANNER

(76) Inventor: Bruce Brumberg, 76 Berkshire Rd., Newton, MA (US) 02460

( * ) Notice: Subject to any disclaimer, the term of this patent is extended or adjusted under 35 U.S.C. 154(b) by 1130 days.

(21) Appl. No.: 09/669,057

(22) Filed: Sep. 25, 2000

(51) Int. Cl.
*G06Q 40/00* (2006.01)

(52) U.S. Cl. .......................................... 705/37; 705/35

(58) Field of Classification Search .................. 705/36, 705/35, 37
See application file for complete search history.

(56) References Cited

U.S. PATENT DOCUMENTS

| | | | | |
|---|---|---|---|---|
| 5,913,198 | A * | 6/1999 | Banks | 705/4 |
| 5,918,217 | A * | 6/1999 | Maggioncalda et al. | 705/36 R |
| 5,991,744 | A * | 11/1999 | DiCresce | 705/36 |
| 6,012,044 | A * | 1/2000 | Maggioncalda et al. | 705/36 |
| 6,021,397 | A * | 2/2000 | Jones et al. | 705/36 |
| 6,253,192 | B1 * | 6/2001 | Corlett et al. | 705/36 |
| 6,269,346 | B1 * | 7/2001 | Cristofich et al. | 705/37 |
| 6,349,290 | B1 * | 2/2002 | Horowitz et al. | 705/35 |
| 6,947,904 | B1 * | 9/2005 | Macey | 705/35 |
| 2001/0056391 | A1 * | 12/2001 | Schultz | 705/36 |

OTHER PUBLICATIONS

PR News; "Share the Wealth, But Take the Stock of Vested Employees", Aug. 23, 1999 vol. 55, Iss 33: p. 1.*
PayCheckCity.Com Adds New Paycheck Calculators and Features To Successful Website, Market Wire, May, 2000.*
website page of the PayCheckCity.Com dated Jun. 9, 2000.*
Prior, Chris; Wealth watch, Treasury & Risk Management; Aug. 1999, vol. 9 Issue 6, p. 64, 2p.*

* cited by examiner

*Primary Examiner*—Jagdish N Patel
(74) *Attorney, Agent, or Firm*—Robert K. Tendler

(57) ABSTRACT

A system is provided for educating and training employees and others about their stock options with an online stock option planner that includes customizable easy-to-use calculators and modeling tools, easy-to-read customizable content, and an online stock option tracker for keeping personal records, including option expiration and vesting dates, along with easy-to-navigate community forms, which together serve as a vehicle by which a user can access information and personal guidance on stock options and other forms of equity compensation.

7 Claims, 9 Drawing Sheets

Fig. 4

Calculators | My Records | Modeling Tools | Articles | Resource Center | Discussion myStockOptions.com  Privacy About Us Home Search

Try our other Calculators, Tools and Options Trackers (icons in the yellow bar).

(Calculators) —160

I Need Cash. How many shares should I exercise?

Enter the amount of cash you need in the space to the left. Then press Calculate to see the number of shares you need to exercise and sell in order to receive your required cash after taxes.

Total Cash Needed /—162
$ [ 50,000 ]

186—(Details)

Total Shares to Exercise 168

166

As of Date
[ 9/15/2001 ] —164

Gain $50,000
(Less Total Tax) 0.00 —170
See Tax Breakdown

Net After Taxes $50,000 —172
Cash Needed $50,000 —174
Excess Cash $0.00 —176

Stock Symbol: NYT
Share Price: $ [ 90.00 ]  188—(Edit)
187

Tax Rates
Fed: 38% —178
Soc: 6.20% —180
Med: 1.45% —182
CA: 6% —184

Grants to Exercise (Oldest grants first. See MyRecords for a complete list of grants.)

| Grant Num. | Grant Date | Type | Shares to Exercise | Exercise Price | Exercise Cost | Total Value | Total Gain | Tax Withheld | Net After Taxes |
|---|---|---|---|---|---|---|---|---|---|
| 1000 | 20-Jun-1995 | ISO | 625 | $10.00 | $6,250.00 | 56,250.00 | $50,000.00 | $0.00 | $50,000.00 |
| | | Totals: | 625 | | $6,250.00 | 56,250.00 | $50,000.00 | $0.00 | $50,000.00 |

Fig. 5

Comparison Tool - MyStockOptions.com

Summary Comparison (See details below -- sacroll down.)

| Grant Number | Grant Date | Remaining Term | Grant Price | Shares Exercisable | Net Future Gain From Grant | Net Future Gain Alternative Investment | Difference | Calculated Strategy(+) |
|---|---|---|---|---|---|---|---|---|
| 1000 | 20-Jun-1995 | 3.76 Years | $10.00 | 10,000 | $715,532.34 | $734,376.83 | ($18,444.49) | Sell and purchase alternative investment |
| 7 | 15-Jun-1995 | 4.00 Years | $20.00 | 8,000 | $544,843.01 | $531,456.52 | $13,386.48 | Hold Grant |
| 1000 | 20-Jun-1996 | 3.76 Years | $10.00 | 10,000 | $692,670.41 | $707,617.32 | ($14,946.91) | Sell and purchase alternative investment |
| 1000 | 20-Jun-1999 | 7.76 Years | $30.00 | 5,000 | $523,325.24 | $492,916.74 | $30,408.50 | Hold Grant |

(+) Calculated Strategy makes no allowance for the different risks associated with investing in your company's stock and your alternative investemnt. It assumes that both your grants and alternative investment grow at the rates you entered in the table above
You should consult a professional financial advisor before making any investment decision.

Fig. 7A

Detailed Comparison (See MyRecords for a complete list of grants.)

| Basic Grant Information | | | | |
|---|---|---|---|---|
| Grant Number | 1000 | 7 | 1000 | 1000 |
| Grant Type | *ISO | *ISO | NO | *ISO |
| Grant Date | 20-Jun-1995 | 15-Sep-1995 | 20-Jun-1996 | 20-Jun-1999 |
| Expiration Date | 20-Jun-2005 | 15-Sep-2005 | 20-Jun-2005 | 20-Jun-2009 |
| Remaining term of Grant | 3.76 Years | 4.00 Years | 3.76 Years | 7.76 Years |
| Current Gain Calculations (as of 15-Sep-2001) | | | | |
| Shares Exercisable | 10,000 | 8,000 | 10,000 | 5,000 |
| Exercise Price | $10.00 | $20.00 | $10.00 | $30.00 |
| Exercise Cost | $100,000.00 | $160,000.00 | $100,000.00 | $150,000.00 |
| Total Face Value | $900,000.00 | $720,000.00 | $900,000.00 | $450,000.00 |
| Total Gain | $800,000.00 | $560,000.00 | $800,000.00 | $300,000.00 |
| - Federal Taxes | ($304,000.00) | ($212,800.00) | ($304,000.00) | ($114,000.00) |
| - State Taxes | ($48,000.00) | ($33,600.00) | ($48,000.00) | ($18,000.00) |
| - Other Taxes | $0.00 | $0.00 | $0.00 | $0.00 |
| - Medicare | N/A | N/A | ($11,600.00) | N/A |
| - Social Security (1) | N/A | N/A | ($4,724.40) | N/A |
| Taxes Owed | ($352,000.00) | ($246,400.00) | ($366,324.40) | ($132,000.00) |
| Net Gain (2) | $448,000.00 | $313,600.00 | $431,675.60 | $168,000.00 |
| Future Value of Grant if Held For Remaining Term | | | | |
| Number of Years | 3.76 | 4.00 | 3.76 | 7.76 |
| Annual RAte of Return | 12.00% | 12.00% | 12.00% | 12.00% |
| Total Future Value | $1,378,450.61 | $1,132,933.94 | $1,378,450.61 | $1,084,509.36 |
| Total Future GAin (3) | $1,278,450.61 | $972,933.94 | $1,278,450.61 | $934,509.36 |
| - Federal Taxes | ($458,811.23) | ($369,714.90) | ($458,811.23) | ($355,113.56) |
| - State Taxes | ($76,707.04) | ($58,376.04) | ($76,707.04) | ($56,070.56) |
| - Other Taxes | $0.00) | $0.00) | $0.00) | $0.00) |
| - Medicare | N/A | N/A | ($18,537.53) | N/A |
| - Social Security (1) | N/A | N/A | ($4,724.40) | N/A |
| Taxes Owed | ($562,518.27) | ($428,090.93) | ($585,780.20) | ($411,184.12) |
| Net Future Gain (2) | $715,932.34 | $544,843.01 | $692,670.41 | $523,325.24 |

Fig. 7B

Comparison Tool- MyStockOptions.com
Alternative Investment Calculations (4)

| | | | | |
|---|---|---|---|---|
| Present Value (Cost Basis) | $448,000.00 | $313,600.00 | $431,675.60 | $168,000.00 |
| Total Future Value | $834,995.72 | $608,000.71 | $804,569.82 | $607,076.68 |
| Taxable Future Gain(5) | $386,995.72 | $294,400.71 | $372,894.22 | $439,076.68 |
| - Federal Taxes | ($77,399.14) | ($58,880.14) | ($74,578.84) | ($87,815.34) |
| - State Taxes | ($23,219.74) | ($17,664.04) | ($22,373.65) | ($26,344.60) |
| Taxes Owed (6) | ($100,618.89) | ($76,544.18) | ($96,952.50) | ($114,159.94) |
| Net Future Gain | $734,376.83 | $531,456.52 | $707,617.32 | $492,916.74 |

Fig. 7C

INTERNET-BASED EMPLOYEE STOCK OPTION PLANNER

FIELD OF INVENTION

This invention relates to stock options and more particularly to an on-line system for informing a holder of stock options, restricted stock, and participants in employee stock purchase plans as to the worth, value, or status of their company options and stock holdings.

BACKGROUND OF THE INVENTION

As will be appreciated, stock options are utilized by many companies not only to reward present employees for services provided, but also to entice new employee hires. Companies in the past have had difficulty in communicating with and educating employees as to the status of their stock options or other information relating to their stock options, since stock option plans vary significantly from company to company and involve complex tax, legal, and financial planning issues. Moreover, in order for an individual to make intelligent decisions as to what to do with his or her stock options, these tax and legal implications must be taken into consideration.

It is usually not up to the company itself to advise employees about tax and legal ramifications or in fact do much more than merely present the employee with their stock option agreement. If one is to try to provide a universal system to inform the employees about a stock option program, it is necessary to take into account each of the different companies' individual stock plans, which is difficult due to the diversity of the plans available.

As a result, companies do not at the present time provide education and training, or give information to their employees as to how to maximize the benefits of their stock options plans. Moreover, even if a company were to do so, tailoring the advice to an individual employee is oftentimes difficult because the company may or may not have sufficient information from the employee to provide reliable information.

Additionally, it will be appreciated that financial institutions oftentimes view an individual's stock options and other forms of equity compensation as a resource or source for attracting clients to address the kinds of needs for money management which these institutions can provide and which the client needs. Thus, there is a need for a system which will provide readily accessible information on an individual's particular situation both for the individual, for their employer, and the financial institutions seeking to attract clients who have equity compensation packages.

In short, there is an important need to address the option holder's personal finance and educational needs and company needs to provide education and training on stock options to help employees maximize their benefits and understand the corporate goals or the plan. While in the past the ability to provide individuals with advice tailored to their particular situation was done on a manual basis, there is a need to provide a more convenient way to get information to participants in stock options, stock purchase and restricted stock programs. Moreover, there is a need for interactive financial planning calculators and tools as well as informational content including articles, question and answer in FAQs form, glossary, and global tax guide, along with discussion forum and other interaction with experts. Also, a key environment is personal record keeping, which includes data related to option exercise, expiration, and vesting, and restricted stock vesting and expiration.

By way of further background and as will be appreciated, there are millions of people in the US and now overseas who participate in stock option plans. A need exists to provide not only senior executives, directors, and key employees at every public company with information related to their stock options or restricted stock, but also to provide such information throughout the workforce. Stock option grants have become broader and company-wide, making them an integral part of many employee's compensation. Of course, countless numbers of people also hold stock options in pre-IPO companies. As a result, participants in these plans are sitting on billions of dollars in options gains, representing much of the new wealth of this country. It will be appreciated that stock option revenues rival the amounts in qualified plans such as 401K plans and IRA's. Moreover, brokerage firms and financial advisors are in need of tools and content to reach these individuals to handle their stock plan transactions and manage their money. Individuals also let valuable in-the-money options expire, as they fail to monitor their option holdings, and may have options from multiple companies.

Note, few participants hold the stock option after exercise. For numerous reasons they take their option profit before the standard 10-year term and either diversify the money into alternative investments, meaning stock and mutual funds, buy high ticket items such as a cars, furniture and houses, or do things such as take vacations or use the monies for weddings or renovations of their homes. In short, these are the types of people, who the financial service companies and numerous other advertisers wish to reach and market their services.

Moreover, presently millions of people now look to the Internet as a prime source of personal financial and investment information. This trend is reshaping the financial services industry. The desire of the individual to take control over their financial future is both demonstrated and encouraged by the proliferation of investment and online brokerage websites.

SUMMARY OF THE INVENTION

To help individual's take control of their own financial future, to have much more information than was previously available to be able to determine it, and to help companies with their stock plan communications, education, and training, in the subject system, this information is presented over the Internet in a way in which what is presented to the user is both customizable to the individual's particular situation and his company's goals, and permits the individual to make rational decisions as to the exercise or non-exercise of the individual's stock options or other future company stock transactions.

For this purpose, a number of tools and calculators are provided to permit modeling customized to fit the individual's needs. In one embodiment, tools, calculators, and content can be customized and regularly updated online. Moreover, the presentation to the user can be updated and expanded based on developments and the needs of companies and financial institutions.

Note, the same information is of great benefit to the company granting the stock options or indeed, to the financial institution seeking to manage the individual's stock portfolio. In the subject invention this information is made readily available and is tailored by the individual to his or her specific situation. The information presented is also modifiable through a modeling system which presents various scenarios, thereby to present to the individual various possibilities in the management of the stock options he or she holds.

The subject system is online both in terms of providing a server at which all the information to be presented is generated and by presenting the individual with content through a web site to meet the option holder's personal finance, education, and training needs. The server may also be used as the company's communication link to the employees and can establish education and training goals for those involved in the stock option program. Moreover, a financial institution's interest in attracting individuals with stock options can be served by providing a stock option planner service.

In one embodiment, many interactive and customizable features are provided in an attractive user interface, which is easy to use. At the root of the ability to present the user with information which is readily usable in order to make intelligible choices about stock options, the subject system provides an easy-to-use calculator and modeling tools dynamically linked from a database of their option records specific to the user's particular stock option and restricted stock grants.

In one scenario, the "Quick Take" calculators tell the users their net gain after taxes, personalized by state of their residence. In another embodiment, the "I Need the Money" calculator lets the user fill the amount of money needed and see which options to exercise to obtain it. The modeling tools also help the user to determine when to exercise options by looking at comparisons to alternative investments.

The "Quick Take" calculator operates in two different modes or versions. The first version interacts dynamically with the data that has previously been entered by user or drawn in automatically from another database. This database is referred to herein as the "My Records" database and in a preferred embodiment is an online stock option record tracker. Note that the data can be drawn in from another server to populate or fill in the fields in his or her personal database. The user then selects either vested, unvested or outstanding options to use in the calculation, after which is entered in the current market price of the stock involved.

Upon clicking on "Calculate" in the "Quick Take" calculator, the user is presented with the net gain after taxes based on the state they live in and the tax rate. The user may edit and save for return use the federal tax withholding, social security withholding, or state withholding. The result is that they and can see a specific breakdown of the taxes that get withheld at exercise of the option.

Moreover, the user can model stock price by entering specific increases and decreases by percent in the stock price and seeing what their gains would be.

In another embodiment of the "Quick Take" calculator, one can enter in the number of options in the field that says "Total Shares Options" instead of pulling it from a "My Records" database.

The subject invention also provides modeling tools to help users determine when to exercise their options by looking at comparisons of alternative investments. For instance, if an individual has stock options in a particular company, and the options are vested with six years remaining in the term, then the individual may wish to know if it is appropriate to exercise these options, sell the stock and put it into an alternative investment such as a mutual fund; or alternatively wait until the option term which will be six years later. The results of either of these two scenarios is immediately calculated and is presented to the individual so that the individual can make an intelligent choice as to whether to exercise his or her options now or wait.

As an important part of the subject invention, an online stock option tracker is provided for record keeping purposes, including option expiration and investing dates. This is the part of the "My Records" database and can be used for monitoring options in multiple companies.

Moreover, each of the above calculators, modeling tools, and online record keepers permits changing of the "As of Date" to permit the user to ascertain on the "As of Date" what the situation would look like for options and at different stock prices.

While the above relates to information presentation at the user's terminal, equally as important is the advice that can be given to the user online from experts through the utilization of easy-to-access original articles, questions and answers on approximately 400 equity compensation and stock option topics in form of FAQs, a glossary, a global tax guide, and a discussion forum. All are specially designed to meet the individual's company's, and financial institution's and customizable requirements.

Ease of use for the content relates to categories and breakdown by topics from basic to sophisticated financial planning topics relating specifically to stock option arena.

For instance, easy-to-read content in the form of continually new, original articles written for an individual with options is presented by the content provider over its server. FAQs with answers from experts on every conceivable stock compensation question are presented along with an extensive glossary of stock compensation terms. Moreover, a global personal tax guide, detailing the tax rules in 25 countries is provided to the user.

Additionally, in one embodiment, easy to navigate community forms such as a discussion board and an "ask the experts section" allow for additional human interaction and personalized responses on stock compensation issues.

The result of the provision of the above system is the provision of robust interactive tools and calculators that reflect the realities of people's time, patience, and knowledge for using web applications, particularly those involving stock options. Additionally, through the content provider, the individual is able to read and access leading experts in stock options. Moreover, by utilization of a central server, deep original content is provided which is continuously updated and provided in a format that is easy to read and absorb online. Articles on topics of interest to individuals, including themes that companies want to stress with their employees may also be provided. This includes for instance handling volatility in the particular company stock, long term financial planning about stock options, and other matters.

It will be appreciated that the subject system can weave parts of the provider's web site into existing online offerings of other companies and providers in the corporate stock plan market such as brokerage firms and third party stock plan administrators.

Moreover, the ability to have a central server that provides all parts of the site can be customized and private labeled, with content and tools specific to a company's or financial institution need.

What is therefore provided is a deep content, easy-to-read and search system which utilizes easy-to-use calculators and modeling to understand the value of option and planning alternatives. Moreover, online option record keeping and community features are provided to facilitate for instance a discussion forum and an "ask the experts" section.

What is therefore provided is a system to help the users realize the most value possible from their employee stock options and for companies to communicate and educate employees on stock options. The content, calculators and community available at the central server can make people smarter about the financial planning, tax and legal issues surrounding stock option. Moreover, the subject system provides education and guidance to help users make intelligent decisions about their stock options and other forms of equity pay.

In summary, a system is provided for educating and training employees and others about their stock options with an online stock option planner that includes customizable easy-to-use calculators and modeling tools, easy-to-read customizable content, and an online stock option tracker for keeping personal records, including option expiration and vesting dates, along with easy-to-navigate community forms, which together serve as a vehicle by which a user can access information and personal guidance on stock options and other forms of equity compensation.

In one embodiment, a simplified calculator is provided in which the employee or other user may input a number of shares, exercise price, company stock price, percent increase of stock price, state, tax information and social security data.

In a further embodiment, the individual's specific stock option information is entered including expiration date, grant date, vesting date and type of option. This information is utilized in an online record keeping system which results in the presentation of a visual display of various scenarios by which the user can make optimum choices in the exercise of his or her options. In still further embodiment, an "I Need the Money" option presents to the user in a dynamic link to the records, the ability to maximize returns from the employee stock options at a specific time based on the amount of money that the user needs, taking into account the user's tax bracket, and other tax status information.

In another embodiment, a "Quick Take" calculator presents to the user the value of the user's vested, unvested or outstanding options at various market prices, taking into account tax-related information that is easily editable.

In a still further embodiment, an alternative investment modeling tool is provided which helps the user decide whether to exercise the options, put it into an alternative investment or wait to exercise until the end of the option term.

Moreover, content is provided through a server under the control of an information publishing company specializing in stock option and equity compensation, which provides the user with information so that the user can better manage his or her stock option portfolios and so that the companies can better communicate with their employees as to the particulars of the stock option plans.

Alternatively, realtime stock quotes input at the server, can be made available to the user so that the user can model or record benefits of exercising their particular stock options based on current stock prices.

BRIEF DESCRIPTION OF THE DRAWINGS

These and other features of the subject invention will be better understood with the Detailed Description in conjunction with Drawings of which:

FIG. 4 is a diagrammatic representation of the "Quick Take" calculator which accesses the "My Record" database to provide an estimate of gain based on either outstanding, vested, or unvested option shares taking into account federal tax and social security considerations;

FIG. 5 is a diagrammatic representation of the "I Need the Money" calculator in which the total cash needed is enterable in a field, with the result being a display of the vested options the user needs to exercise to reach this amount net after taxes;

DETAILED DESCRIPTION

Figure 1:
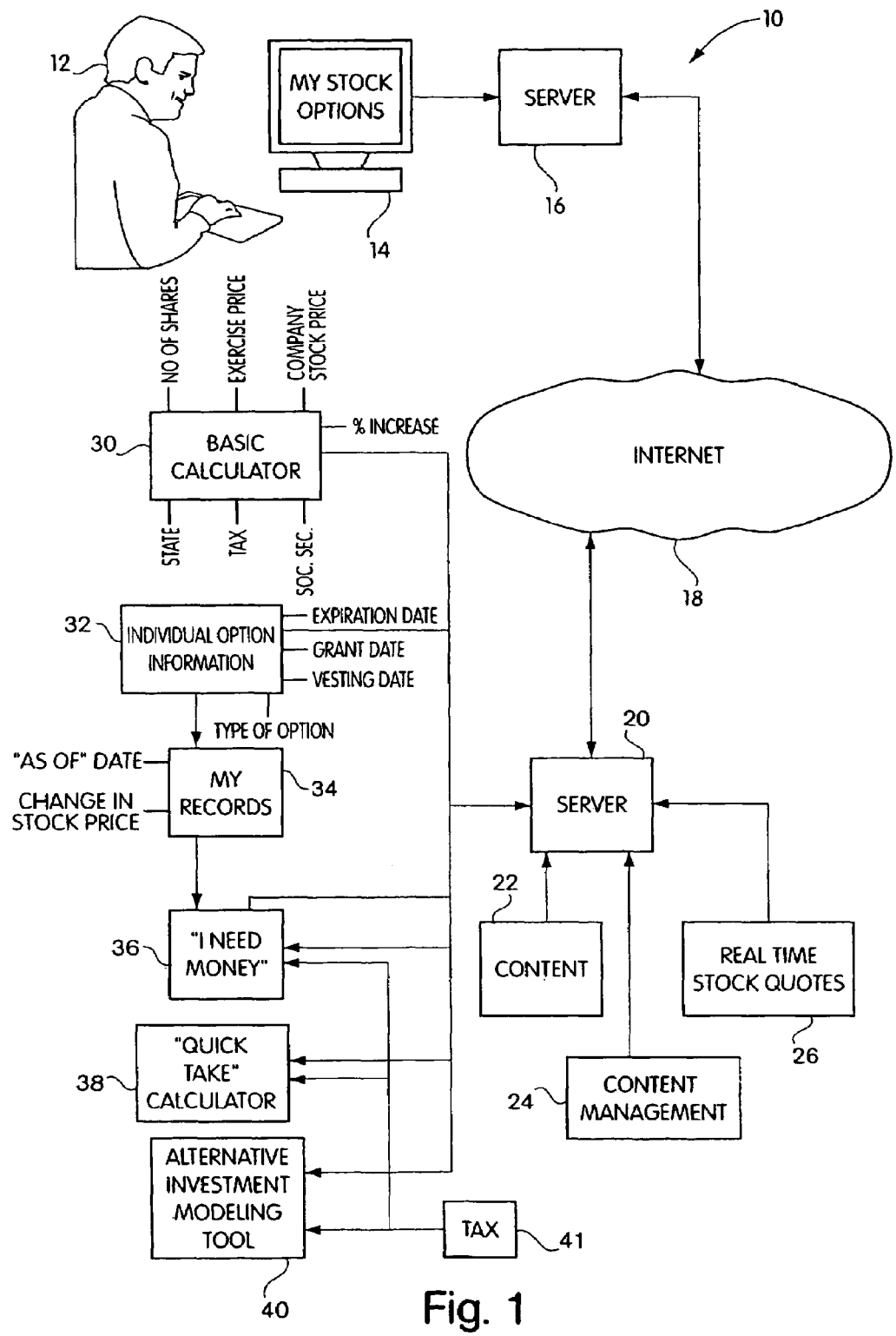
FIG. 1 is a block diagram of the subject system illustrating modeling and calculations as well as record keeping and written content to be able to supply the user with sufficient information to make intelligent choices with respect to his or her employee stock option plan.

Referring now to FIG. 1, a system 10 is illustrated in which a user 12 views a terminal 14 that displays information relative to the user's stock options. Terminal 14 is coupled to a server 16 which connects to the Internet 18 and thence to a provider's server 20 to which is supplied content 22 managed by a content manager 24. Optionally for the use of the person seeking information on his or her stock options is a realtime stock quote unit 26 which can provide user 12 with realtime stock quotes for a company of interest, namely his or her own.

When the user first logs on, assuming the user has not entered any previous personal stock option information into the system, after an initial sign-up in which basic registration information is collected, including state of residence, a basic calculator 30 enables the first time user to get a quick view of his or her stock option scenario by entering in the number of shares, exercise price, company stock price, and also edit the percent increase/decrease of stock price and the tax withholding information, such as the state in which the individual is working, a higher federal tax rate, and social security payments made to date. As will be seen, the results of the entry of this limited amount of information gives the first time user a direct answer on the value of the worth of his or her stock options. However, as will be described, the options data may come from the "My Records" database, once the database has been established either by the user or drawn from information in another database.

The user will wish to enter into the system information personally tailored to his or her stock option plan, and this is done at entry device 34 the for "My Records" database in which the user can enter into the appropriate fields for each grant, the expiration date of his or her stock options, the grant date, the vesting schedule, and the type of option or restricted stock. Alternatively, user data is drawn in automatically from another database, such as one used by company or financial institutions for stock plan administration or wealth management services. This information can also be from another server to populate or fill in the fields in the "My Records" database.

This information is maintained on the server and the user updates it for future exercise of the stock options and sales of the stock or it is done automatically when information comes from another database. This information is downloaded to a "My Records" database 34 and when the user goes to the "My Records" part of the system, different visual presentations are possible by changing the stock price amounts and the "As of Date", making the "My Records" database an online record keeper, a tracker to monitor key personal dates, and a modeling tool. Moreover, tables that are viewed in the "My Records" database may be accessed upon demand with any stock price and the "As of Date" used. As will be seen, this provides the user with a complete table of information which will enable the user to make intelligent choices about his or her stock plan, and track their status, including vesting and expiration dates.

The "My Records" database is utilized and accessed dynamically by an "I Need the Money" tool 36, a "Quick Take" calculator or tool 38, and an Alternative Investment Modeling Tool 40 as will be seen.

The "I Need the Money" tool provides a table which enables the user to enter in the amount of money that he or she needs for personal use, followed by showing how this money can be received by the user after exercising and selling selected vested stock options or restricted stock net of taxes. The "Quick Take" calculator on the other hand, in accessing the "My Records" database 34, provides the user with a rapidly calculated scenario in which net gains after taxes are presented, which also allows the user to edit the tax and withholding information and to model increases and decreases in stock price. These tools also permit the user to change stock price and the "As of Date" to bring into the calculations options that vest or terminate later dates.

As illustrated at 40, an Alternative Investment Modeling tool permits the user to compare the results of exercising before the date of an option grant's expiration or not, permitting the user to determine whether or not to exercise an option grant at a given earlier date and put the proceeds into alternative financial investments or to hold onto the stock options until the end of their term All of the above information in tabular form is complemented by the provision over the Internet of an extensive, deep, and original content provided by experts in the field of stock options. This structured content includes frequently asked questions or FAQs in easy-to-read Q&A format, a glossary, articles, a global tax guide, an ask our experts format, and a discussions forum. The content is provided in easily accessible form and through a directory and categorization, including a search engine, which permits the user to query the system for various questions the user may have with respect to his or her stock options, or stock options in general.

While the subject system is pictured as having the entire process take place at a centralized server which may be under the control of the content provider, calculations and modeling can be performed at the user's terminal. However, using the Internet eliminates the problem of downloading specialized software to each user and makes uniform the entire process.

Moreover, the utilization of a centralized server by the content provider permits rapid updating of information for legal and tax changes or as new financial strategies emerge. This can be done to inform of changes in the Securities and Exchange Commission's rules, court cases, new tax laws and IRS rules, or in fact any type of strategies which provide current thinking in the stock option area.

Moreover, it is sometimes useful to be able to have the user access his or her company's stock quote on a realtime basis to be able to utilize the modeling and calculation functions available at his or her terminal.

As will be seen, the subject system presents to the user information which is critical in the user's management of his or her stock portfolio to maximize gains or provide information in realtime relative to his or her stock option plan.

It will be appreciated that the same information that is provided to the user's terminal may be provided either at the company, or at the financial services or planning institution so that should advice be necessary from either of these latter institutions, it can be rapidly be given to a client or an employee.

Figure 2:
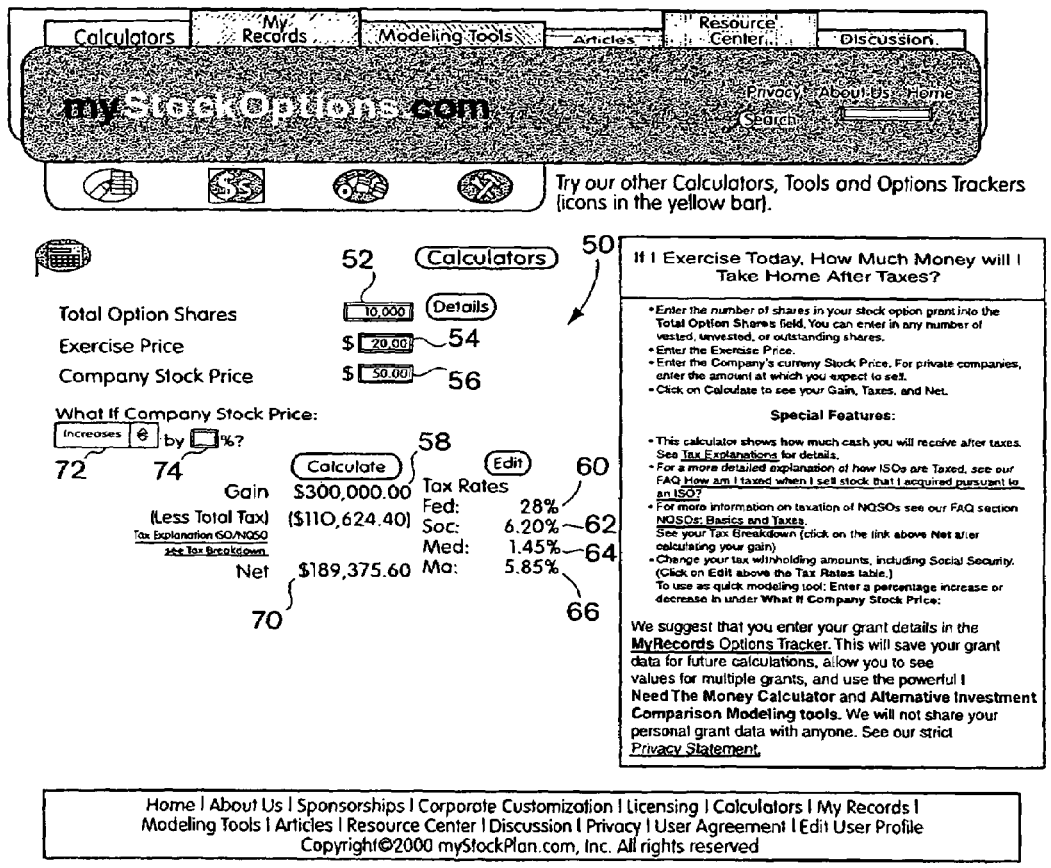
FIG. 2 is a diagrammatic representation of a basic calculator indicating a field for the entry of total option shares, exercise price and company stock price, as well as increases and decreases of stock price by percentage, and changes in tax withholding amounts.

Referring now to FIG. 2, a window 50 is provided for basic calculator 30 in which a field 52 permits the total number of options shares to be initially entered by the first-time user. The user may enter the exercise price at field 54 and a stock price, however determined, at window 56. The result in field 58 is the gain given the exercise costs and certain tax information such as federal tax 60, which as a default is set at 28%, social security withholding 62, again set as a default at 6.20%, Medicare set as a default at 1.45% as illustrated at 64, and state tax 66 for a given state here illustrated at 5.85%.

User can edit amounts in fields 60, 62, 64, 66 and can see a full breakdown of tax withholding totals in field 68 by clicking with mouse on see "Tax Breakdown". In field 70, user sees the result of subtracting the tax total from the gain at field 58.

The basic calculator is also provided with a field which permits the user to vary the stock price by first entering whether the stock is to increase or decrease. This is input at field 72. Field 74 is used to input by how much the stock is to increase or decrease in terms of percentage increase or decrease.

The result is that the first-time user may be given an overview and the specific value of the value of a stock option grant, with a limited amount of information being needed to provide such an answer to this complex question.

To perform this calculation the Total Option Shares in 52 is multiplied by the Company Stock Price in 56. Subtracted from this amount is the Total Option Shares in 52 multiplied by the Exercise Price in 54 to provide the Gain in 58. Subtracted from that amount are the taxes owed for federal, state, local, and Social Security in fields 60, 62, 64, 66, which are totaled at field 68 which can be edited, to get Net. Company Stock Price in 56 can be changed by increasing or decreasing percentages in field 74, and this will change Gains and Net.

Figure 3:
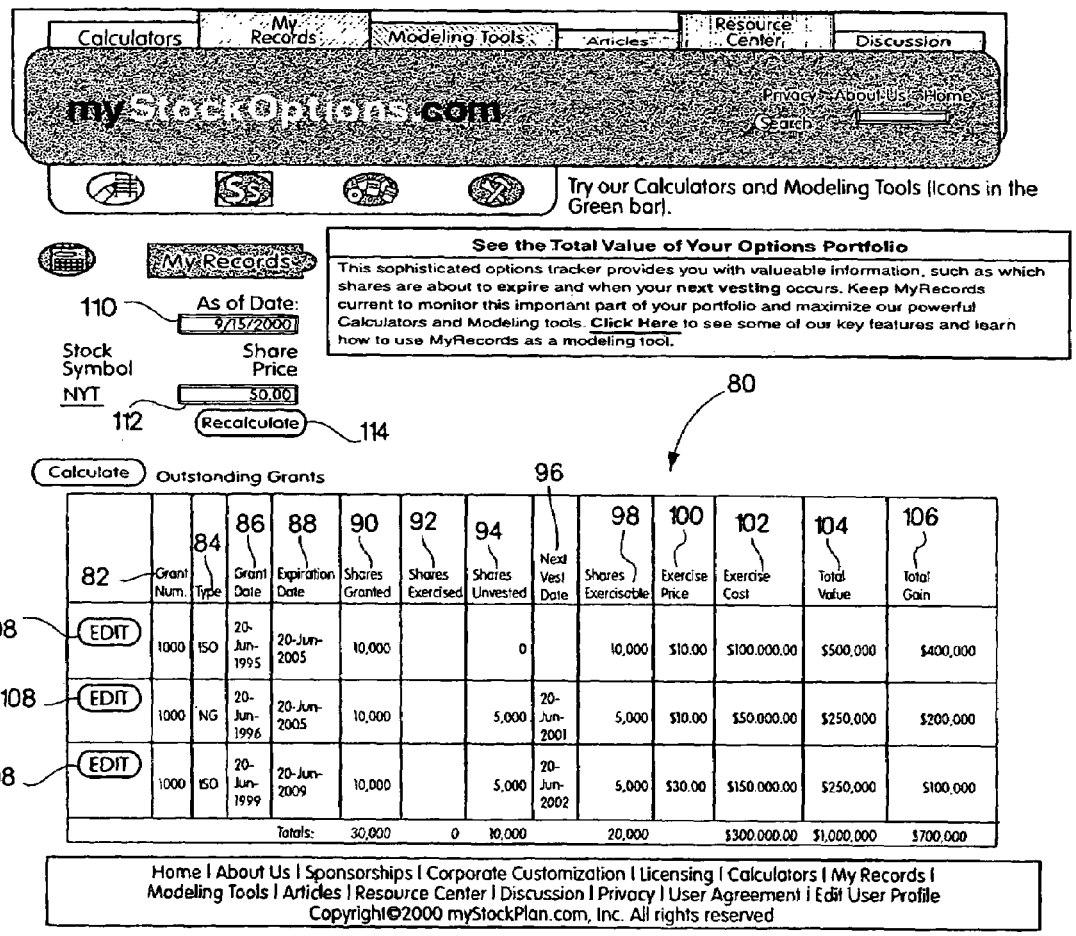
FIG. 3 is a diagrammatic representation of the "My Records" database and options tracker illustrating the types of personal information which may be entered into the table in terms of outstanding grants, grant type, expiration date, shares granted, shares exercised, shares unvested, next vest date, shares exercisable, exercise price, exercise cost, total value and total gain.

Referring now to FIG. 3, what is described is the "My Records" database. Here the information that is entered into the "My Records" database is illustrated at table 80, which includes a listing for instance of a grant number 82, the type of grant 84, the grant date 86, the expiration date 88, the shares granted 90, the shares exercised 92, the shares uninvested 94, the next vest date 96, the shares exercisable 98, the exercise price 100, the exercise cost 102, the total value 104, and the total gain 106. With these fields having the appropriate data entered therein, which is done on another data entry screen, not shown, the individual is given a table and option tracker reflecting the outstanding grants in his or her option and restricted stock portfolio, with the total value and the total gain being calculated by entries into the other fields, along with critical personal dates, such as expiration and next vesting. The user can also sort the grant records by clicking on column headings 84, 86, 88 and 96.

Grant data can be entered for multiple companies. As will be seen, all of these fields may be edited through an edit icon 108 so that the "My Records" database can carry updated information for exercises of options and sales of stock, which is utilized by other tools or calculators of the subject invention. Note that in one embodiment the visual representation automatically changes as vesting dates are reached.

The calculations made by the "My Records" database include defining the "As of Date" which is entered into field 110 and the stock symbol entered into field 112, such that if a realtime stock quote is available, this may be automatically entered. By changing the "As of Date" in field 110 from today to some future date, the visual representation of the stock grants can change as more shares vest and thus show as "Shares Exercisable" in field 98 as some stock grants expire. The current stock price or in fact any stock price may be entered into this Share Price field. "Recalculate" icon 114 then provides that the "My Records" database recalculate the total value and the total gain, given information in the other fields.

When the user clicks on the "Calculate" button, the exercise cost, total value, and total gain is calculated based on the information in fields 98, 100, as well as the data in field 112. When the user changes the "As of Date" in field 110, which would then include options or stock that vests at this later date, and the Share Price in field 112, the user clicks on the Recalculate button. As a result of the recalculations, the number of shares and amounts in fields 94, 98, 100, 102, 104, and 106 change.

Figure 4:
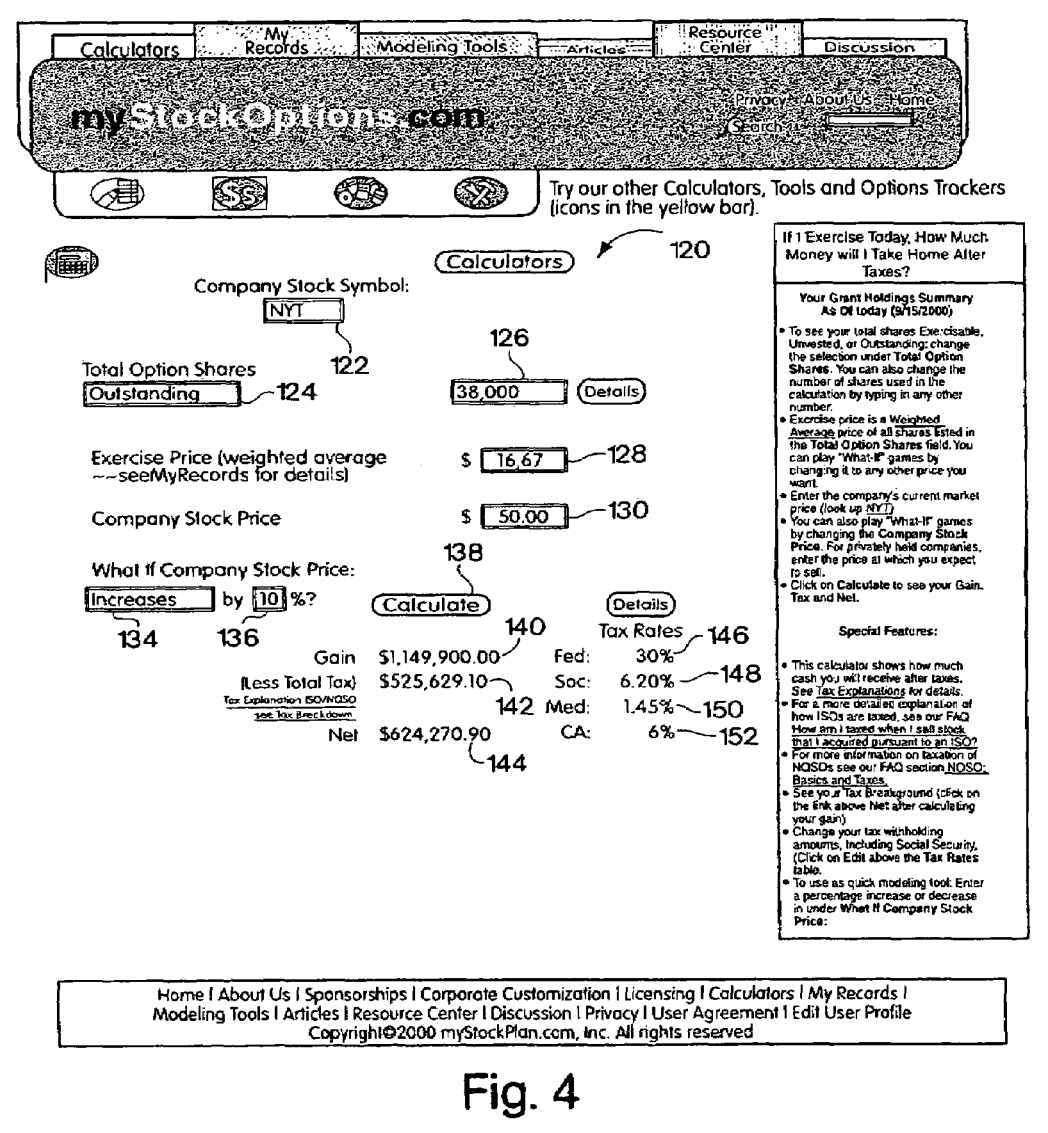

Referring now to FIG. 4, "Quick Take" calculator 38 is utilized for a quick overview of a person's stock options. It is different from the basic calculator in that it gets its input dynamically from the "My Record" database. The overview is provided on a screen 120 which has a window for a company stock symbol field 122 and a total option shares field 124, with the number of option shares being either outstanding, vested, or unvested pulled in or drawn in dynamically from the "My Records" database. The total number of options is provided in field 126. An exercise price, which may the weighted-average from the "My Records" database, appears in field 128, whereas the stock price may be entered in field 130, either from the company stock symbol or manually entered.

Importantly, the "Quick Take" calculator provides a means by which a user can see what will happen if the company's stock price increases or decreases as enterable at field 134 and by how much. The percentage increase or decrease is entered into field 136. Upon clicking on the calculate icon 138, the gain 140 is determined, less total tax entered in field 142, to give a net gain in field 144, taking into account a federal tax field 146, a social security withholding in field 148, a Medicare/Medicaid withholding field 150 and state tax field 152, all of which can be edited in amounts.

To perform this calculation the Total Option Shares in field 124, which the user selects from unvested, vested, and outstanding, is multiplied by the Company Stock Price in field 130. Subtracted from this amount is the Total Option Shares in field 124 multiplied by the Exercise Price in field 128 to provide the Gain in field 140. Subtract from that are the taxes owed for federal, state, local, and Social Security in fields 146, 148, 150, 152, which can be edited, to obtain the Net in field 144. Company Stock Price in 130 can be changed by increasing or decreasing percentages in field 136 and this will change Gains and Net.

Referring now to FIG. 5, an "I Need the Money" calculator or modeling system 160 is shown in which a field 162 is used to specify the amount of total cash needed to be realized. A field 164 permits the user to enter the total cash needed as of a particular date, so as to include the options that are vested as of that date according the "My Records" database. A field 166 is utilized to indicate the total number of shares to exercise and the gain is illustrated at field 168. The tax breakdown provides the amount of tax to be subtracted from the gain here illustrated at field 170, whereas the net gain after taxes is presented at field 172. Cash needed appears in field 174, with the excess cash available provided in field 176. Note, that the user may enter his or her federal tax rate at field 178, social security withholding at field 180, Medicare/Medicaid at field 182 and his or her state tax rate at field 184.

With all this information entered, clicking on the "Calculate" icon 186 provides the total shares to exercise and sell to realize the gain required to give the needed cash. At the bottom of the screen shown in FIG. 5, the user sees in table form the options from vested grants that should be exercised, the number of shares from each grant, the taxes withheld, and the net for each grant that added together equals the Total Cash Needed. Moreover, tax rates and other tax information may be edited by clicking on the edit icon 188, with different treatments applied for non-qualified and for incentive stock options as defined in the Internal Revenue Code.

This calculation starts with the oldest outstanding grant of vested options in the Shares Exercisable field in the "My Records" database. The options in this grant are multiplied by the company Share Price in field 187. Subtracted from this amount is the number of shares from the Shares Exercisable field in the "My Records" database for that grant multiplied by the Exercise Price for that grant to obtain the Gain. Subtracted from this result are the taxes owed for federal, state, local, and Social Security, which can be edited for non-qualified options, to obtain the Net. This calculation is performed for each vested grant or part of each grant and added together until the Net after taxes in field 172 equals the Total Cash Needed in field 164, including any excess cash because options cannot be exercised in fractional amounts. Both the share price and the "As of Date" can be edited to see outcome in different scenarios for future price increases and when more shares vest, drawing in more exercisable shares from the "My Records" database.

Figure 6:
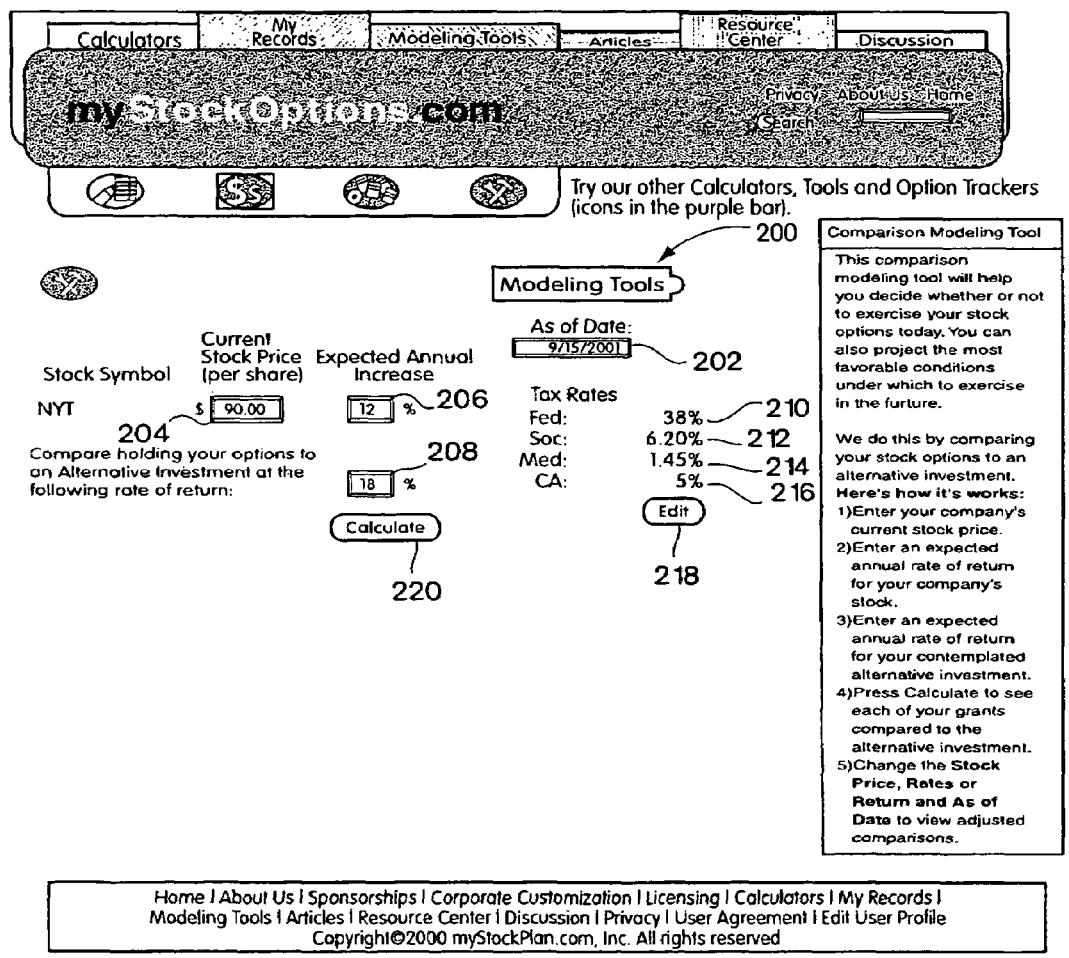
FIG. 6 is a diagrammatic representation of a comparison modeling tool in which the user enters in two different percentages gains, for instance the expected annual increase in percentage of the company's stock and the percentage increase in an alternative investment to determine whether and when to exercise the options. For the calculators, modeling tools, and record keepers the "As of Date" and the stock price are changeable to provide the user with insight into future financial outcomes; and, FIGS. 7A, 7B and 7C are a diagrammatic representations of tables illustrating the results of the comparison of whether to sell and purchase an alternative investment or hold the grant.

Referring now to FIG. 6, a Comparison Investment Modeling tool 200 is utilized to analyze the user's stock portfolio, whether it be in stock options or otherwise, to be able to compare gains as of a date entered into field 202 based on current stock price entered into field 204. It uses for the comparison two different expected annual increases, namely those entered in the Company Stock Price field 206 and the Alternative Investment Rate Of Return field 208. Again, editable tax rates such as federal tax may be entered at field 210, social security at field 212, Medicare/Medicaid at field 214 and state tax rate at field 216. This is accomplished by clicking on edit button 218 to provide variables for the calculation. Upon clicking on the calculate icon 220 the result presented to the user is depicted as the tables of FIGS. 7A, 7B and 7C.

Referring now to FIGS. 7A, 7B and 7C, a summary comparison table 230 presents the user with information relative to the comparison and provides in field 232 the summary of the results of the calculated strategy as to whether to exercise the vested option grant, sell the stock, and to purchase an alternative investment; or to hold onto the grant to exercise and sell at the end of the option term. Results are shown for each grant that is vested. Here the table includes the grant number field 234, the grant date field 236, the remaining years in term field 238, the grant price field 240, the shares exercisable field 242, total gains exercisable from holding the grant field 248 and from an alternative investment entry field 250, which provides a calculation of the difference between the two strategies, here illustrated at field 252.

It will be appreciated in the above example that the two different scenarios are based on the expected annual increase for one stock versus another investment. In the illustrated example, the first stock may be that associated with the employee stock option, where the second stock, bond, or mutual fund is that which is associated with an alternative investment with a specified rate of return.

Note, that while the subject system may be utilized for stock option plans, the comparison tool described above is exceedingly useful in the comparison of any two types of investment with any two different rates of return where there are tax implications and differences between selling early and waiting to sell. Information utilized in the comparison tool is dynamically drawn from the "My Records" database, at least in terms of the individual's vested stock options.

To perform this comparative calculation for each vested grant in the Shares Exercisable in the "My Records" database, the options in that grant are multiplied by the Company Share Price in field 204. Subtracted from this amount is the same Shares Exercisable in the "My Records" database multiplied by the Exercise Price for each of the vested Shares Exercisable to obtain the Gain. Both the share price and the "As of Date" can be edited to see outcomes in different scenarios for future price increases and when more shares vest.

Subtracted from this total is the withholding taxes owed, which can be edited, to get the Net. This amount is then multiplied by an annual increase in the alternative investment percentage to determine the value of the alternative investment at the end of the option term. This investment is then sold at capital gains rates at end of option term. This cash amount is then compared to waiting to exercise the options and sell the stock at the end of the option term, with the stock price itself having grown by the expected annual increase in field 206. This comparative calculation is performed for each vested grant and a strategy is recommended based on the mathematical differences between the expected annual increases and the tax treatments, with ordinary income rates at exercise and capital gains rates for sale of the alternative investment.

Having now described a few embodiments of the invention, and some modifications and variations thereto, it should be apparent to those skilled in the art that the foregoing is merely illustrative and not limiting, having been presented by the way of example only. Numerous modifications and other embodiments are within the scope of one of ordinary skill in the art and are contemplated as falling within the scope of the invention as limited only by the appended claims and equivalents thereto.

The invention claimed is:

1. An Internet-based Comparison Modeling Tool for providing an individual who is an employee or consultant of a company and has been awarded stock options the ability to analyze whether to exercise a vested stock option quickly or at another "as of" date at or before the end of the term, with the proceeds being used to find an alternative investment vehicle, or whether to wait until at or close to the end of the term of an option grant to exercise that option, comprising the steps of:

storing in a server coupled to the Internet information about the individual's stock option plan relative to a company stock, including for each grant the exercise price, the present stock price, vesting schedule, and term of the option grant;

inputting at the server a projected annual percentage increase in the company stock price based on the company's past performance, estimated future performance, or other number the individual enters in as the projected company stock price and a projected annual percentage increase in an alternative investment value;

inputting tax information relative to the individual at the server;

calculating at the server overall gain based on the stored and inputted information including taking into account the selected "as of" exercise dates, the projected annual percentage increase for the company stock price and the inputted projected annual increase in value for the alternative investment for the two cases of (1) exercising a vested stock option within the stock option term, setting a first "as of" date at or close to the present date and (2) waiting to exercise the vested stock option at a second "as of" date at or closer to the end of the term of the stock option, the calculating step including:

(a) calculating the gain for the alternative investment based on a stock option exercise at the first "as of" date and using the proceeds from the exercised grant to fund the alternative investment, the gain being calculated by taking the after-tax gain from exercising the stock option at the first "as of" date, calculating the growth in net proceeds for the alternative investment using the projected increase in the alternative investment, and then calculating the net gain in the alternative investment by subtracting the tax basis in that investment and the capital gains tax on the proceeds from the sale, thus to determine the net gain for the alternative investment from the first "as of" date to the second "as of" date, and (b) calculating the gain that results from waiting to exercise the stock option grant at the second "as of" date, including calculating the value of the stock option based on the projected annual increase in the company stock price at the second "as of" date, subtracting from this value the exercise cost of the stock option and then the taxes to determine the net gain from exercising at the second "as of" date;

comparing the two gains by grant to arrive at the greater of the gains; and, displaying the result of the comparison step, thus to permit maximizing of the individual's gain, whereby the individual is given information as to whether to immediately exercise an option grant or to exercise the option grant closer to the end of the term of the stock option.

2. The method of claim 1, wherein the gain is calculated based on one of vested options and any specific number of options.

3. The method of claim 1, wherein the personal tax information includes one of federal tax rate for the individual, state tax rate for the individual and social security year-to-date information for the individual.

4. The modeling tool of claim 1, wherein the first "as of" date is today's date.

5. The Internet-based comparison modeling tool of claim 1, wherein the first "as of" date is between today's date and the second "as of" date.

6. The internet-based comparison modeling tool of claim 1, wherein the second "as of" date is at the end of the option term.

7. The Internet-based comparison modeling tool of claim 1, wherein the second "as of" date is between the first "as of" date and the end of the term, whereby the second "as of" date is set closer to the end of the term.

* * * * *